US010637906B2

(12) United States Patent
Hulick, Jr. et al.

(10) Patent No.: US 10,637,906 B2
(45) Date of Patent: Apr. 28, 2020

(54) DYNAMIC SOCKET QOS SETTINGS FOR WEB SERVICE CONNECTIONS

(71) Applicant: Cisco Technology, Inc., San Jose, CA (US)

(72) Inventors: Walter Theodore Hulick, Jr., Pearland, TX (US); Harish Nataraj, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 200 days.

(21) Appl. No.: 15/800,025

(22) Filed: Oct. 31, 2017

(65) Prior Publication Data

US 2019/0132377 A1 May 2, 2019

(51) Int. Cl.
*H04L 12/801* (2013.01)
*H04L 12/851* (2013.01)
(Continued)

(52) U.S. Cl.
CPC ............ *H04L 67/02* (2013.01); *H04L 47/193* (2013.01); *H04L 47/24* (2013.01);
(Continued)

(58) Field of Classification Search
CPC ... H04L 29/00; H04L 29/08; H04L 29/08081; H04L 29/0809; H04L 29/08576–08594;
(Continued)

(56) References Cited

U.S. PATENT DOCUMENTS

| 6,078,953 | A | * | 6/2000 | Vaid | ...................... H04L 12/2856 370/235 |
| 6,426,943 | B1 | * | 7/2002 | Spinney | .............. H04L 12/4625 370/235 |

(Continued)

FOREIGN PATENT DOCUMENTS

EP          2562646          2/2013

OTHER PUBLICATIONS

Ashwin, "How to register class method as C callback" Sep. 2015, Code Yarns.*

(Continued)

*Primary Examiner* — Tauqir Hussain
*Assistant Examiner* — Boris D Grijalva Lobos
(74) *Attorney, Agent, or Firm* — Behmke Innovation Group LLC; James M. Behmke; James J. Wong

(57) ABSTRACT

In one embodiment, a process on a computer receives a callback in response to an intercepted outbound web service connection called by an application executing on the computer. The process extracts information from the callback, e.g., at least a URL for the outbound web service connection and a code location within the application from which the outbound web service connection was called. Additionally due to the callback, the process obtains access to a core TCP socket for the outbound web service connection. The process determines how to modify socket options of the core TCP socket based on selected criteria according to the extracted information from the callback, and may then modify the (Continued)

socket options of the core TCP socket according to the determining. The modified socket options thus cause downstream network devices to handle traffic on the outbound web service connection based on the modified socket options.

21 Claims, 10 Drawing Sheets

(51) Int. Cl.
    *H04L 29/06* (2006.01)
    *H04L 29/08* (2006.01)
(52) U.S. Cl.
    CPC ........ *H04L 65/1069* (2013.01); *H04L 67/146* (2013.01); *H04L 67/322* (2013.01)
(58) Field of Classification Search
    CPC ... H04L 29/08945–08972; H04L 41/00; H04L 41/50–5003; H04L 41/5009; H04L 41/5019–5025; H04L 47/00; H04L 47/19; H04L 47/193; H04L 47/24; H04L 47/2425; H04L 47/2433; H04L 65/00; H04L 65/10; H04L 65/1066; H04L 65/1069; H04L 65/80; H04L 67/00; H04L 67/02; H04L 67/14–142; H04L 67/146; H04L 67/32; H04L 67/322
    See application file for complete search history.

(56) References Cited

U.S. PATENT DOCUMENTS

| | | | | |
|---|---|---|---|---|
| 6,577,596 B1* | 6/2003 | Olsson | ............. | H04L 29/06 370/230 |
| 6,728,748 B1* | 4/2004 | Mangipudi | ......... | H04L 41/5009 709/226 |
| 6,775,291 B1* | 8/2004 | Ryu | ............. | H04W 80/00 370/338 |
| 7,002,979 B1* | 2/2006 | Schneider | ......... | H04L 47/2416 370/412 |
| 7,020,143 B2 | 3/2006 | Zdan | | |
| 7,058,802 B1* | 6/2006 | Epstein | ............. | H04N 7/1675 348/E7.056 |
| 7,146,505 B1* | 12/2006 | Harada | ............. | G06Q 20/206 713/185 |
| 8,244,864 B1* | 8/2012 | Bahl | ............. | H04L 69/162 709/225 |
| 8,443,438 B1* | 5/2013 | Sharir | ............. | H04L 67/02 380/258 |
| 8,533,687 B1* | 9/2013 | Greifeneder | ........ | G06F 11/3495 717/127 |
| 8,787,836 B1* | 7/2014 | Carbajal | ............. | H04W 24/08 455/67.11 |
| 8,943,180 B1* | 1/2015 | Petit-Huguenin | ....... | H04L 67/16 709/223 |
| 9,356,804 B1* | 5/2016 | Passaglia | ............. | H04L 12/5692 |
| 9,497,065 B2* | 11/2016 | Rizzo | ............. | H04L 67/322 |
| 9,608,917 B1* | 3/2017 | Anderson | ............. | H04L 47/2441 |
| 9,692,725 B2 | 6/2017 | Venkatraman et al. | | |
| 9,800,514 B1* | 10/2017 | Chen | ............. | H04L 47/6275 |
| 2002/0032777 A1* | 3/2002 | Kawata | ............. | H04L 67/1008 709/226 |
| 2002/0087692 A1* | 7/2002 | Woods | ............. | H04L 63/10 709/225 |
| 2002/0138649 A1* | 9/2002 | Cartmell | ............. | H04L 29/06 709/245 |
| 2003/0163608 A1* | 8/2003 | Tiwary | ............. | G06F 11/3414 710/1 |
| 2004/0085359 A1* | 5/2004 | Steg | ............. | H04L 41/22 715/771 |
| 2005/0117586 A1* | 6/2005 | Ikeda | ............. | H04L 47/20 370/395.21 |
| 2006/0224663 A1* | 10/2006 | DiFalco | ............. | H04L 12/66 709/203 |
| 2006/0268851 A1* | 11/2006 | Baratakke | ......... | H04L 29/12009 370/389 |
| 2010/0332473 A1* | 12/2010 | Brodsky | ............. | G06F 8/75 707/736 |
| 2013/0179868 A1* | 7/2013 | Greifeneder | ........ | G06F 11/3624 717/130 |
| 2013/0191525 A1* | 7/2013 | Kang | ............. | H04L 69/162 709/223 |
| 2014/0040437 A1* | 2/2014 | Mitsuya | ............. | H04N 21/4349 709/219 |
| 2016/0028607 A1* | 1/2016 | Weill | ............. | H04L 43/12 709/224 |
| 2017/0212775 A1* | 7/2017 | Armitage | ............. | G06F 9/45504 |

OTHER PUBLICATIONS

Haichuan Wang et al.: "Using the middle tier to understand cross-tier delay in a multi-tier application", Parallel & Distributed Processing (IPDPS), 2010 IEEE International.
Symposium on, IEEE, Piscataway, NJ, Apr. 19, 2010, pp. 1-9.
International Search Report dated Jan. 21, 2019 in connection with PCT/US2018/056860.

* cited by examiner

| HOSTS 705 | CONNECTIONS 710 | LOCATIONS 715 | ORIGINAL SOCKET OPTIONS 720 | MODIFIED SOCKET OPTIONS 725 |
|---|---|---|---|---|
| www.example.com:80 | 2 | (application context) | ToS = 0 | ToS = 3 |
| www.example2.com:80 | 1 | (application context) | N/A | N/A |
| ... | ... | ... | ... | ... |

REPORT 700

FIG. 7

DYNAMIC SOCKET QOS SETTINGS FOR WEB SERVICE CONNECTIONS

TECHNICAL FIELD

The present disclosure relates generally to computer networks, and, more particularly, to dynamic socket quality of service (QoS) settings for web service (HTTP) connections.

BACKGROUND

Quality of Service (QoS) is a well-known computer networking term that describes the overall expected performance of a service, based on such characteristics as packet loss, bit rate, throughput, transmission delay, availability, jitter, etc. In the field of computer networking, specifically, QoS often refers to traffic prioritization and resource reservation control mechanisms rather than the achieved service quality. That is, QoS techniques have been configured for many years to provide different priority to different applications, users, or data flows, or to guarantee a certain level of performance to various data flows.

QoS is particularly important for the transport of traffic with special requirements. For example traditional QoS has been centered on supporting applications with strict network performance requirements, such as Voice over IP (VoIP) technology and many others. Generally, to manage QoS, network customers and providers can enter into a service level agreement (SLA) which specifies guarantees for the ability of a network/protocol to give guaranteed performance/throughput/latency bounds based on mutually agreed measures, usually by prioritizing traffic. In other approaches, resources are reserved at each step on the network for the call as it is set up.

Generally, QoS and priority control has been restricted to higher-level control, such as based on network administrator configurations in conjunction with services offered on network devices (e.g., routers, switches, etc.). In particular, conventional approaches to QoS and priority have been limited to such categories as traffic type, traffic class, network-level priority (e.g., high- or low-priority queueing), and so on, and have not provided individual application stakeholders any instrument to control how their traffic could be handled differently within the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example report generated based on dynamic socket QoS settings for web service connections;

DESCRIPTION OF EXAMPLE EMBODIMENTS

Overview

Figure 1A:
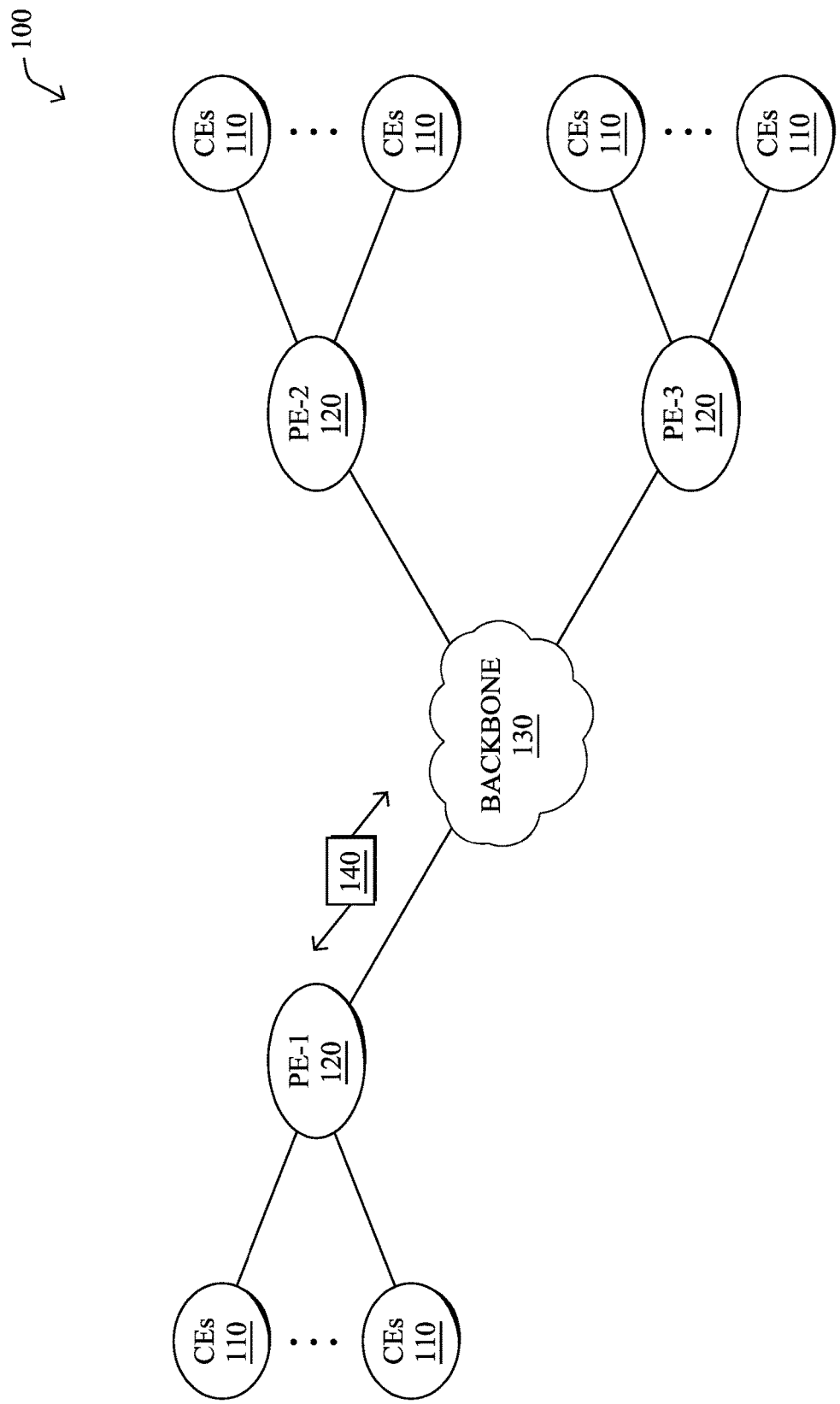
FIGS. 1A-1B illustrate an example computer network.

According to one or more embodiments of the disclosure, techniques herein provide for dynamic socket QoS settings for web service connections. In particular, in one embodiment, a process on a computer receives a callback in response to an intercepted outbound web service connection called by an application executing on the computer. The process may then extract information from the callback, the information comprising at least a uniform resource locator (URL) for the outbound web service connection and a code location within the application from which the outbound web service connection was called. Additionally in response to the callback, the process obtains access to a core transmission control protocol (TCP) socket for the outbound web service connection. Accordingly, the process may determine how to modify one or more socket options of the core TCP socket based on one or more selected criteria according to the extracted information from the callback, and may then modify the one or more socket options of the core TCP socket according to the determining. The modified one or more socket options thus cause one or more downstream network devices to handle traffic on the outbound web service connection based on the modified one or more socket options.

For instance, in another embodiment, a network device may receive a packet having a packet header, and inspects the packet header to detect a transaction classification field within the packet header. As such, the network device may determine how to handle the packet based on a transaction classification associated with the packet within the transaction classification field, and then handles the packet according to the determining.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
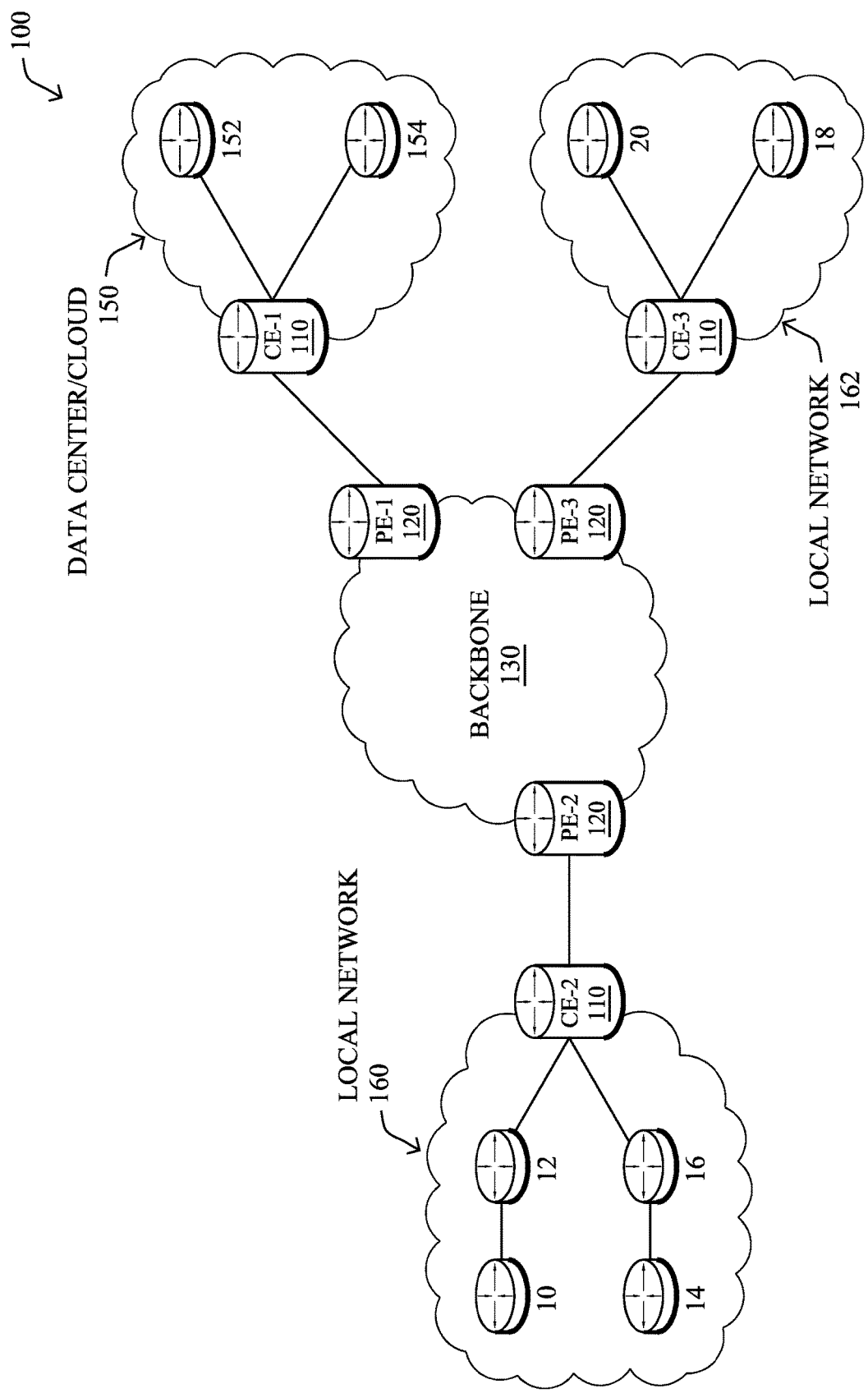

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
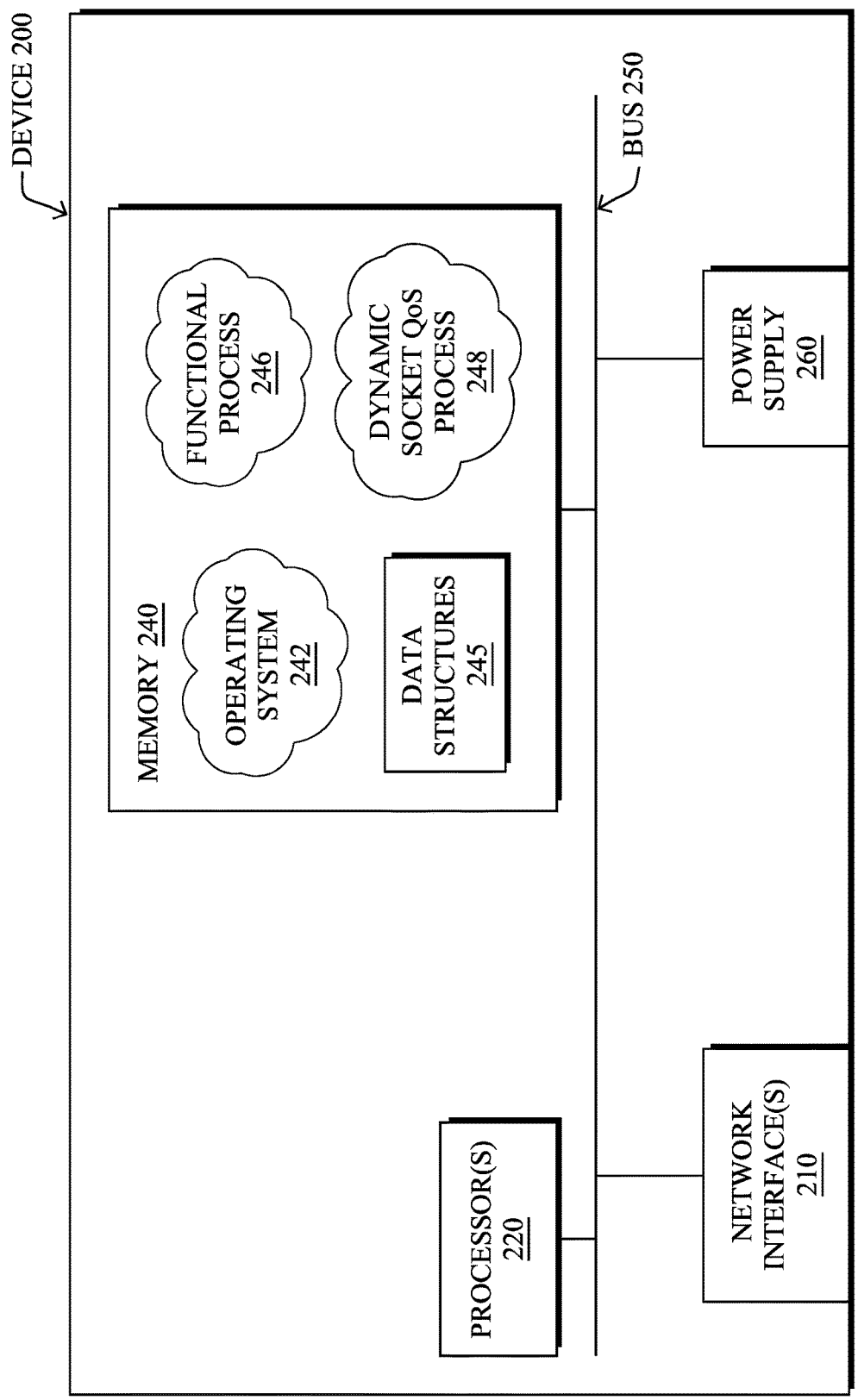
FIG. 2 illustrates an example computing device/node.

FIG. 2 is a schematic block diagram of an example computing device 200 that may be used with one or more embodiments described herein, e.g., as any of the devices shown in FIG. 1 above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes (or "applications") 246, and on certain devices, an illustrative "dynamic socket QoS" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. For example, each node can include one or more machines that perform part of the applications. The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
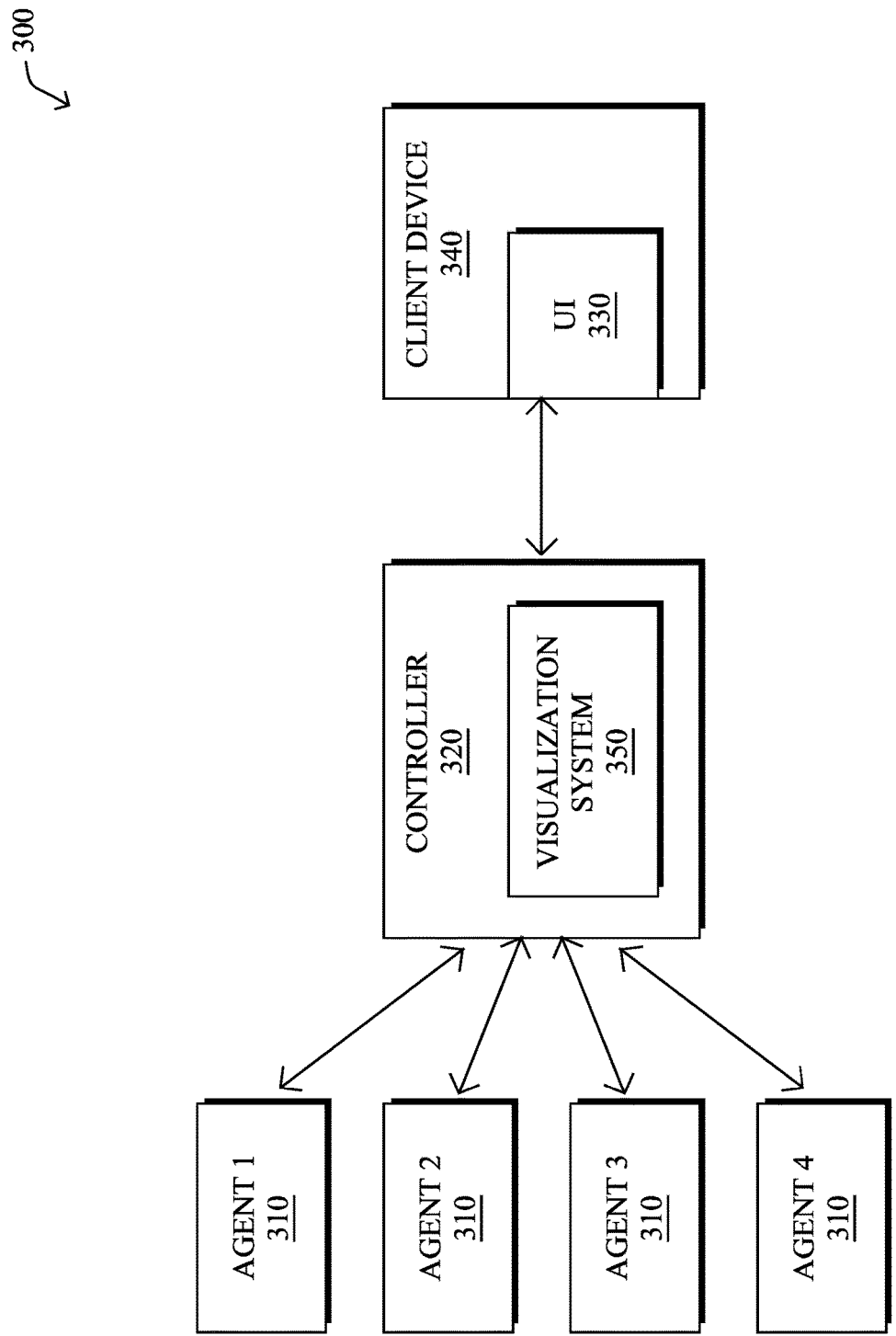
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premise (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Browser agents and mobile agents are generally unlike other monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to an HTTP payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
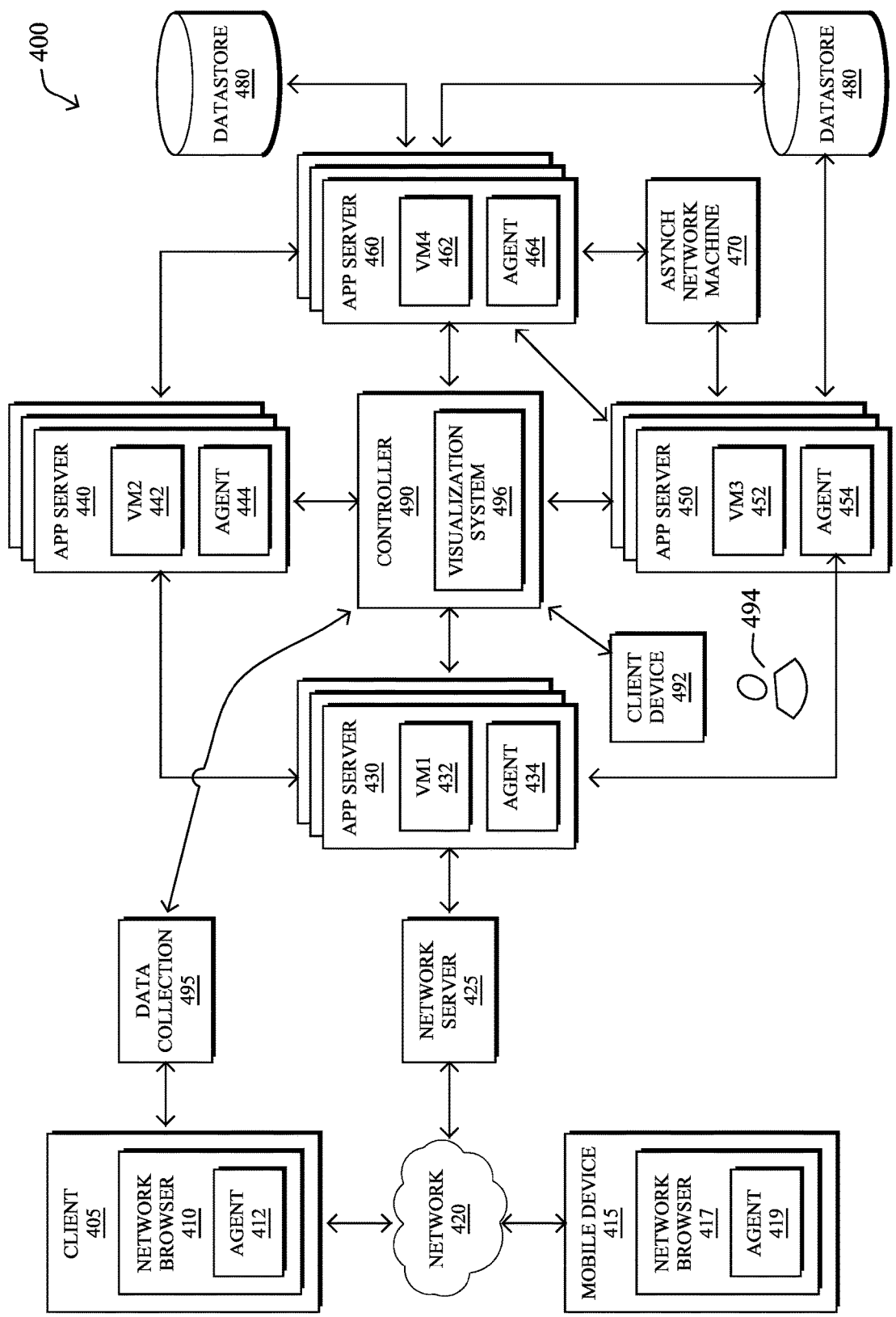
FIG. 4 illustrates an example system for an application-aware intrusion detection system.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may repot data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when a data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
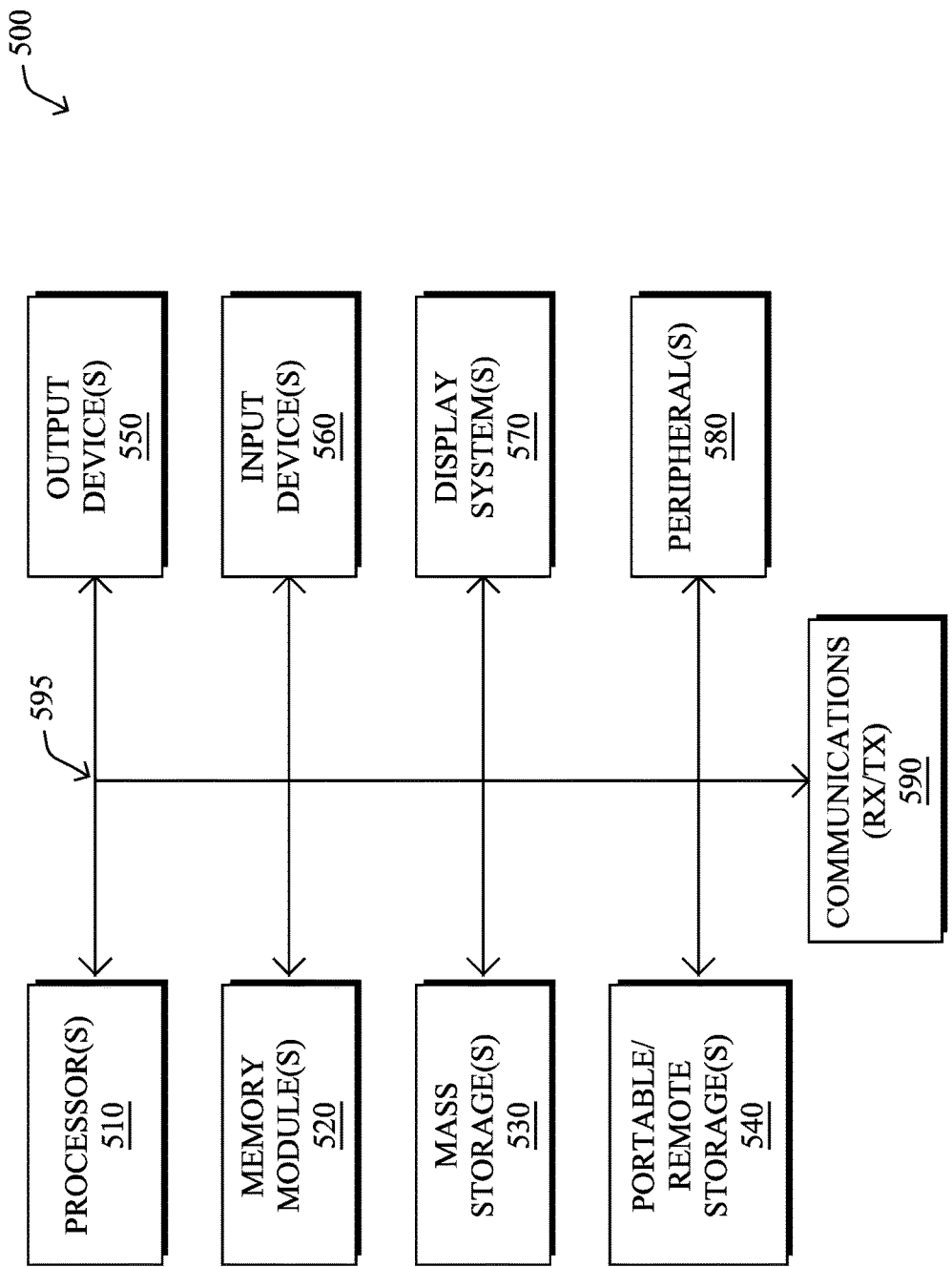
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, a synchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

—Dynamic Socket QoS—

As noted above, Quality of Service (QoS) is a well-known computer networking term that describes the overall expected performance of a service, and QoS techniques have traditionally been configured to provide different priority to different applications, users, or data flows, or to guarantee a certain level of performance to various data flows. As also noted above, however, QoS and priority control has generally been restricted to higher-level control, such as based on network administrator configurations in conjunction with services offered on network devices (e.g., routers, switches, etc.). In particular, as mentioned above, conventional approaches to QoS and priority have been limited to such categories as traffic type, traffic class, network-level priority (e.g., high- or low-priority queueing), and so on, and have not provided individual application stakeholders any instrument to control how their traffic could be handled differently within the network.

The techniques herein, therefore, propose a mechanism for dynamic socket QoS settings for web service (HTTP) connections. In particular, the techniques herein may be configured to intercept outbound web service (e.g., HTTP) connections, and to alter the underlying socket QoS/ToS (Quality of Service/Type of Service) settings to dynamically prioritize (or otherwise manage) handling of outbound connections from an application or client device using a wide variety of selection criteria. In one embodiment, for instance, the techniques may set the socket QoS based specifically on a "transaction type" for purposes of giving higher network priority to outbound connections which match a set of rules according to various criteria, such as, e.g., business transaction (URI), initiating code location (stack location) (i.e., context awareness), host/port combinations, and so on. According to the techniques herein, therefore, it is possible to add granularity for QoS control beyond mere application-based priority, and instead based the control on any available criteria (e.g., business transactions or other contextual characteristic). Note further that the techniques herein also address dynamic QoS settings at the socket layer, which has never before been available, particularly to application stakeholders (e.g., designers, users, clients, enterprise administrators, etc.).

Specifically, according to one or more embodiments herein, a process on a computer receives a callback in response to an intercepted outbound web service connection called by an application executing on the computer. The process may then extract information from the callback, the information comprising at least a uniform resource locator (URL) for the outbound web service connection and a code location within the application from which the outbound web service connection was called. Additionally in response to the callback, the process obtains access to a core transmission control protocol (TCP) socket for the outbound web service connection. Accordingly, the process may determine how to modify one or more socket options of the core TCP socket based on one or more selected criteria according to the extracted information from the callback, and may then modify the one or more socket options of the core TCP socket according to the determining. The modified one or more socket options thus cause one or more downstream network devices to handle traffic on the outbound web service connection based on the modified one or more socket options. For instance, in another particular embodiment, a network device may receive a packet having a packet header, and inspects the packet header to detect a transaction classification field within the packet header. As such, the network device may determine how to handle the packet based on a transaction classification associated with the packet within the transaction classification field, and then handles the packet according to the determining.

Illustratively, the techniques described herein may be performed by hardware, software, and/or firmware, such as in accordance with the illustrative dynamic socket QoS process 248, which may include computer executable instructions executed by the processor 220 to perform functions relating to the techniques described herein, e.g., in conjunction with other corresponding processes of the same device (e.g., applications 246) or of other devices in the computer network (e.g., controllers, routers, switches, etc.) as described herein.

Figure 6:
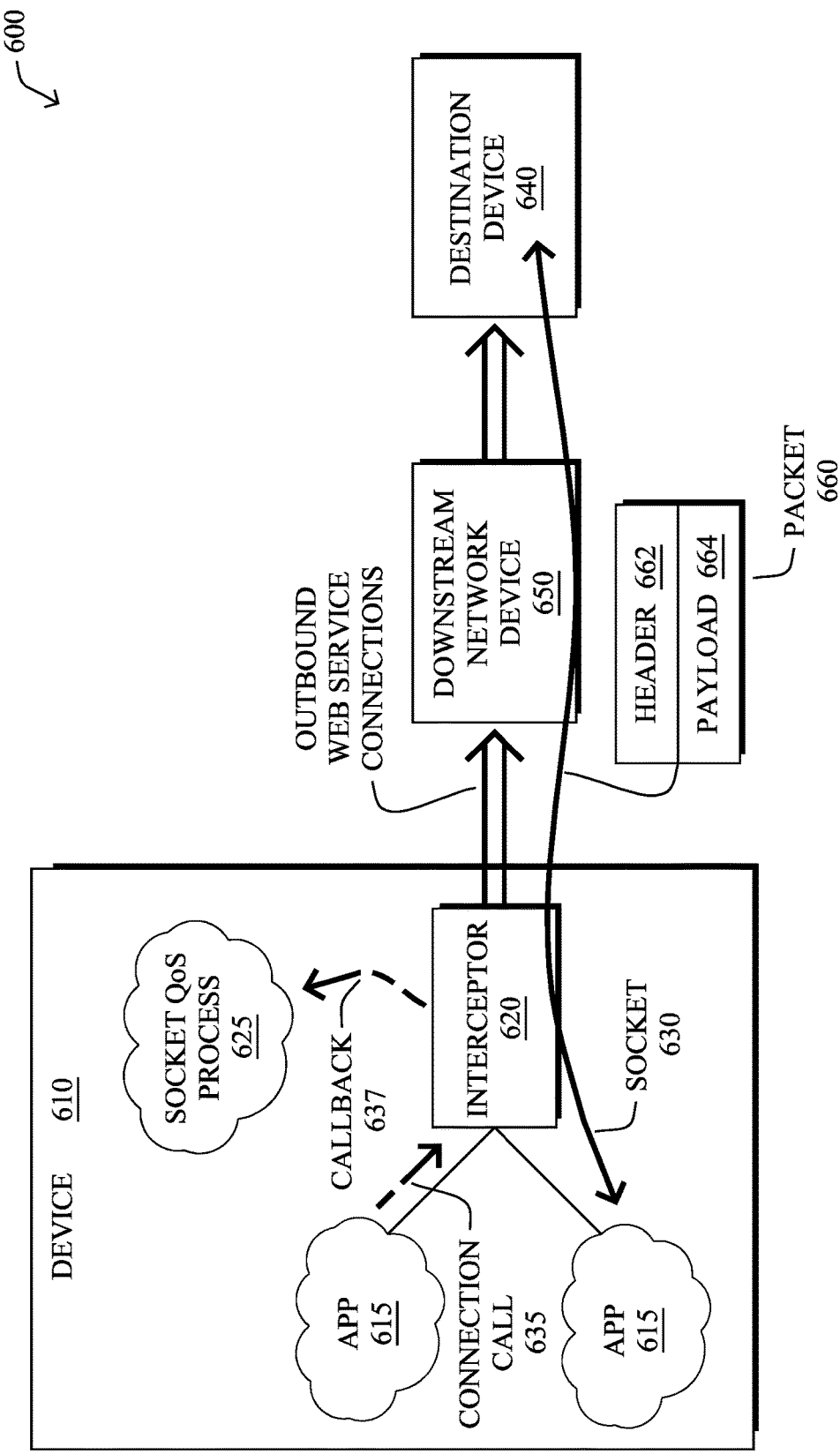
FIG. 6 illustrates an example of a dynamic socket QoS network environment.

Operationally, and with reference generally to illustrative (and simplified) example network environment 600 of FIG. 6, a device 610 may have one or more applications ("apps") 615 that communicate with one or more destination devices 640. For instance, a network socket 630 connects two TCP endpoints for communication (e.g., client/server) via one or more downstream network devices 650 (e.g., routers, switches, load balancers, security devices, and so on). Packets 660 (or other data formats, such as frames) communicate the data between the end devices, and as will be generally understood in the art, comprise header information 662 (e.g., TCP/IP headers, encapsulation headers, etc.) and a payload 664.

In particular, outbound web services from a source device 610 generally travel over the hypertext transfer protocol (HTTP) (or HTTP secure, HTTPS), which rides on top of a Java TCP socket. That is, when an application opens a web service (HTTP), it opens a socket 630 (e.g., through a connection call 635) with default settings. However, the TCP socket is not accessible to the HTTP connection, or, correspondingly, programmers. Java TCP sockets that are created generally have the ability to dynamically set a "Traffic Class" header (and many other TCP important options) that can impact performance. The socket "Traffic Class" header is commonly known as the TCP "Type of Service" (ToS) header, which can be used to inform downstream devices 650 that that some network traffic should have priority over others (e.g., an IPv4 8-bit field, or IPv6 20-bit field, where certain bits may be used to indicate a priority level).

(Note that the techniques herein are protocol-neutral. That is, though much of the discussion herein relates to Java-specific functionality and terminology, Java is merely one example language, and any appropriate language that can operate in a similar manner may be used herein.)

According to the techniques herein, an interceptor process 620 is configured on the device 610 (e.g., at the kernel/operating system) to intercept all outbound web service connections (connection calls 635) at a level where the core client socket can be captured (before it transmits anything). Illustratively, the interceptor may be a separate "handler" or library configured to manage connection calls, or else may be integrated with the illustrative "socket QoS process" 625 (e.g., an instantiation of dynamic socket QoS process 248 above). (That is, the interceptor 620 may be a handler configured as an intercepting class that contains a method to call on entry into an instrumented method, and a method to call on exit from an instrumented method, namely connection calls 635.)

Once the socket call is intercepted, the interception directs a callback 637 to a "decision making" process (e.g., a registered class that receives a callback on every new HTTP connection), such as the illustrative socket QoS process 625 as mentioned, or else in another embodiment back to the application making the call (e.g., for self-regulation). The callback provides information about the socket, such as the URL (which has protocol, host, port, etc.) and the code location for whatever application (module) 615 is attempting to establish the network connection.

As a detailed example, the focus of the interception centers around the HTTP and HTTPS Client classes (e.g., example classes sun.net.www.http.HttpClient and sun.net.www.protocol.https.HttpsClient), which are the core classes for HTTP connections for most (if not all) Java client connections. The HttpClient and HttpsClient static "New" methods are called anytime a connection is needed. (Note that these classes support caching and/or pooling and simply return an HttpClient or HttpClients from cache if it exists or creates a new one.)

One illustrative interception technique that may be used is a lightweight BCI (ByteCode Instrumentation) framework (which dynamically modifies Java classes for the purpose of instrumentation). For example, a simple boot class instrumentation agent (e.g., using Javassist) may be configured to intercept the connection calls, such as by defining a handler (e.g., handlers.NetworkSocketHandler) for each client, dictating the redirection to a socket QoS process 625 (the "NetworkSocketHandler" in the previous definition), essentially handing the socket over to the callback process. (Illustratively, the "rules" that specify the interception may be stored in an agentConfig.yml file.) Regardless of the protocol or processes being used, this callback would occur for each connection call, and then the callback process would have control of the socket before any traffic is transmitted over the socket connection.

Once intercepted (e.g., on the exit so the socket has been created), reflection (only the first time) may be used to get the URL and the java.net.Socket for the HTTP Connection and pass this to the registered callback, accordingly. That is, also included within the callback 637 is the core TCP Socket for the HTTP/HTTPS connection, which can be modified with socket options (as described below, such as adding a configured ToS field as mentioned above). Note that some settings are not possible to set/change once transmission on a socket is initiated (i.e., some options can't be applied post stream), so in such situations it is important to gain access to the core TCP socket (and thus apply modifications as described below) before stream transmission occurs.

According to the techniques herein, the callback process 625 now has the ability to make intelligent decisions about setting various socket options, such as assigning different traffic classes based on a transaction name, code location, host/port, URL options, an application context, and/or other features of the socket. These and other criteria may be read from a general rules file to control performance and tuning based on the criteria, accordingly. Said differently, the socket QoS process 625 needs to determine how it will modify socket options of the core TCP socket based on one or more selected criteria according to the extracted information from the callback. These criteria could be static information (e.g., host name, application, etc.), or may be dynamic, such as behavioral-based factors of the called outbound web service connection (e.g., whether it's a first call, or a too-frequent call, or a call to a particular host after another call to a different host has already been made, and so on). Note also that the process may also need to determine whether any options need to be modified. For example, through every call 635 for every host name will result in a callback 637, perhaps policy configuration dictates that only certain host names would require any socket option modification (e.g., setting any traffic to a particular host, or even more interestingly, setting one particular transaction type of traffic to a particular host, as highest priority traffic).

The transaction name is a great example, where, with reference to the application intelligence platform above, a URI (URL) can be taken, and the associated transaction can be given a name (e.g., a user-understandable name). In this manner, the techniques herein can name the transaction, and then prioritize traffic flows based on the transaction name (i.e., make a decision as to what changes need to be made to the outbound socket). For example, one solution is to put a code within the ToS header (header 662) that relates to the priority for that transaction, so equipment downstream can route the packets based on the ToS header. In this manner, downstream network equipment can be synced with the Traffic Class (ToS) types to prioritize application traffic, basically allowing the Socket QoS process 625 (or the application 615 itself) to statically or dynamically control priority of transaction types (e.g., creating a new protocol and/or using existing ToS protocols).

Note that in one particular embodiment, rather than explicitly indicating a priority value, a transaction class/type field can be used to categorize applications and/or transactions (e.g., instead of a priority, the techniques herein can use a classification). As such, network equipment could know, for example, that some traffic belongs to a revenue-producing transaction, and should have priority over a simple database backup procedure. (Many other examples can be imagined by those skilled in the art, and those mentioned herein are merely illustrating the vast potential offered by the techniques herein—routing network traffic based on transaction classifications.)

Regardless of whether the priority is set by the source device 610 or managed by the network devices 650, an example implementation of the techniques herein illustrates that prioritization beyond conventional techniques (e.g., merely prioritizing voice over data, or one particular user's traffic over another's), such as performing prioritization based on transaction types or even specific business transactions (GUIDs) above. For instance, the techniques herein may advantageously grant revenue transactions (e.g., "buy it") or time sensitive transactions (e.g., "bid now") a higher priority than lower priority simple searches (or even browsing activities of a user who isn't logged in to a shopping cart). The control of such transaction-based priorities may be statically set by an application administrator, or else may be dynamically adjusted, e.g., by an administrator accessing a central controller that is configured to push the updated policies to relevant QoS management services accordingly.

Deciding which socket options to modify is a configurable feature of each specific implementation of the processes herein, depending upon a desired outcome. Though some examples have been mentioned above, an example list of modifications to the socket that may be made according to the techniques herein may include one or more of the following example socket options (notably where none are available in HTTP).

sending urgent data on the socket;
enabling/disabling keepalive on the socket;
enabling/disabling receipt of TCP urgent data;
setting performance preferences for the socket;
setting the socket receive buffer size;
enabling/disabling reusing an address of the socket;
setting the socket send buffer size;
setting a client socket implementation factory for the application;
enabling/disabling and setting a socket linger time;
enabling/disabling and setting a socket timeout;
enabling/disabling a TCP "no-delay" value on the socket;
enabling/disabling a Nagle's algorithm on the socket (potentially part of the no-delay value above);
setting a traffic class in an IP header for packets sent from this socket; and
setting a type-of-service (ToS) field in an IP header for packets sent from this socket.

Notably, in accordance with one or more embodiments herein, certain features and modifications may be based on some machine learning (ML) algorithms to determine optimally adjusted values over time, based on tuning/refinement, or based on behavioral changes over time. For instance, as one example, learning could be performed to determine an average size of transmissions, such that over time the processes herein could change the send buffer size socket option based on what was learned. Once this new value is set, then over time the techniques may further tune the results based on what is further learned, and so on, trying to achieve a desired result (e.g., an actual value, like zero packet loss, or else a broader goal, such as minimum latency, etc.).

According to one or more aspects of the embodiments herein, the processes herein may expose metrics/data (e.g., via JMX), and can be displayed in a graphical user interface (GUI) or various reports (e.g., using JConsole). FIG. 7 illustrates an example report (GUI) 700 that may be generated by the socket QoS process 625 (or other device or process, such as a central controller, server, etc.). The example report may illustrate a list of hosts 700, a number of connections 710 made to those hosts, and associated code locations (e.g., application contexts) 715. According to one particular embodiment, additional columns may also be included, such as one for the original socket option settings 720, and then another for the modified socket option settings 725 of what the connections were changed to (if any changes occurred, that is). Table 700 is not meant to be limiting to the scope of the embodiments herein, and is merely meant to demonstrate the ability to visualize various metrics that may be captured by the processes involved in providing dynamic socket QoS settings for web service connections as described herein.

Figure 8:
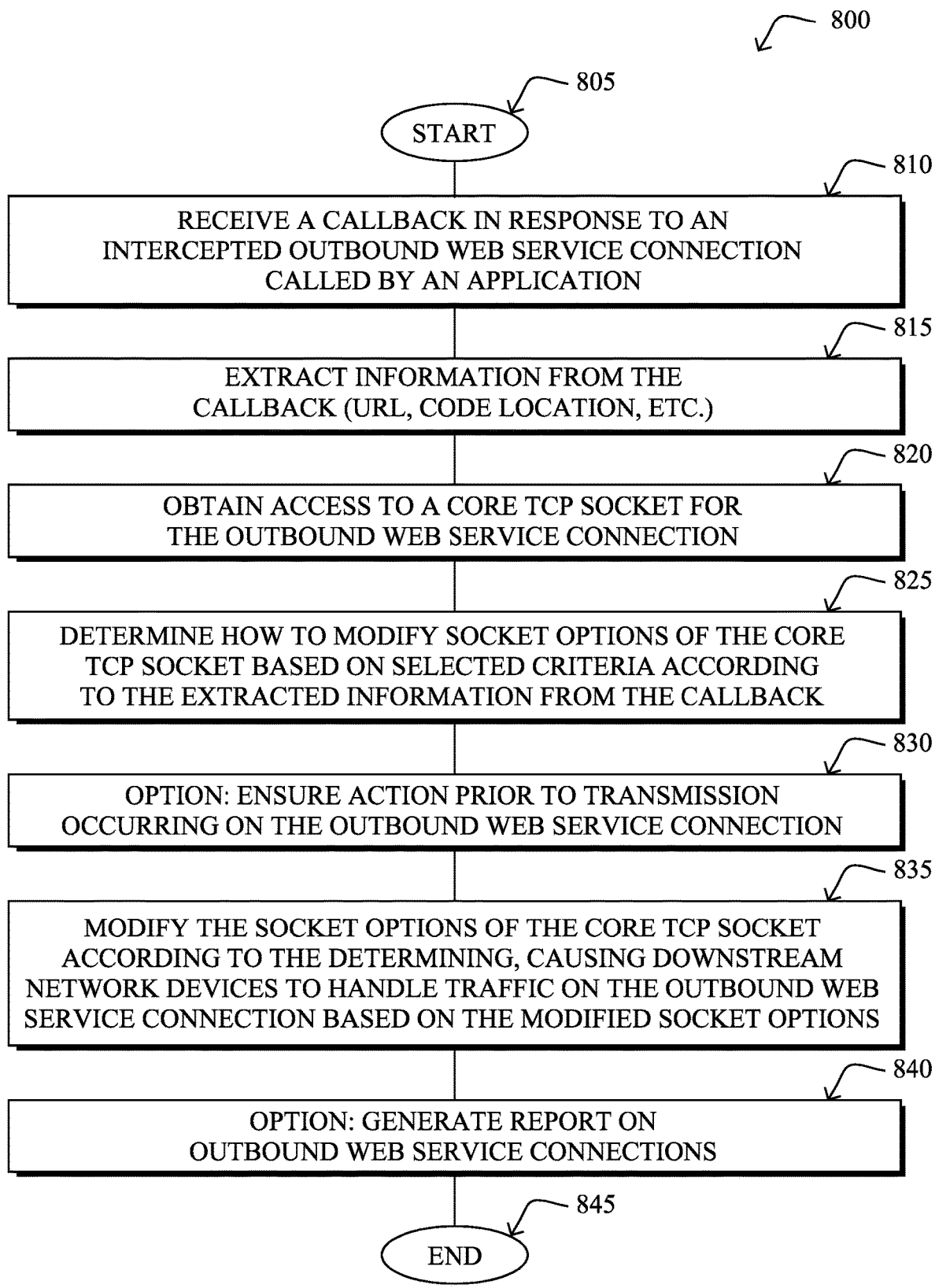
FIG. 8 illustrates an example simplified procedure for dynamic socket QoS settings for web service connections, particularly from the perspective of a process managing the settings.

FIG. 8 illustrates an example procedure for providing dynamic socket QoS settings for web service connections in accordance with one or more embodiments described herein, particularly from the perspective of a process managing the settings. For example, one or more non-generic, specifically configured devices (e.g., a device 610) may perform procedure 800 by executing stored instructions (e.g., dynamic socket QoS process 248, also illustratively socket QoS process 625). For instance, in one illustrative embodiment, the process 625 may be a registered class for a callback, and is separate from the application 615 making a call for an outbound web service connection. In another embodiment, the process 625 is a component (module/library/etc.) of the application 615, itself.

The procedure 800 may start at step 805, and continues to step 810, where, as described in greater detail above, process 625 receives callback 637 in response to an intercepted outbound web service connection call 635 (e.g., HTTP or HTTPS connection) called by an application 615 executing on the computer 610. In one embodiment as mentioned above, the intercepted outbound web service connection may be intercepted by an interceptor 620 (e.g., a byte code instrumentation (BCI) process) on the device.

In step 815, the process may extract information from the callback, namely at least a URL for the outbound web service connection and a code location within the application from which the outbound web service connection was called. In addition, in response to the callback, the process may also obtain access to a core TCP socket for the outbound web service connection in step 820 as detailed above.

In step 825, the process determines how to modify one or more socket options of the core TCP socket based on one or more selected criteria according to the extracted information from the callback, as described in greater detail above. (Notably, step 825 may further comprise determining to modify socket options for only certain outbound web service connections on the device based on one or more selected criteria according to the extracted information from the callback, e.g., for certain hosts only, certain applications only, etc.).

As an example, the one or more selected criteria may comprise a transaction type, which results in certain transaction types having higher priority than other transaction types. Other options for selected criteria are also available herein, such as, e.g., a transaction name, the code location, a host of the URL, a port of the URL, a combination of the host and port, one or more URL fields, the application calling outbound web service connection, a time at which the outbound web service connection was called, and a behavioral-based factor of the called outbound web service connection (e.g., how often a call is made, how many previous calls were made, and so on). In one embodiment, the process may receive instructions from a controller (e.g., 320/490) on how to modify one or more socket options of the core TCP socket based on one or more selected criteria, as described above. Furthermore, as mentioned above, determining how to modify one or more socket options of the core TCP socket based on one or more selected criteria may be directed by a machine learning (ML)-based adjustment of socket options according to learned behavior and a desired outcome.

Optionally, in step 830, the process may ensure that modification (step 835 below) of the one or more socket options takes place prior to any transmission occurring on the outbound web service connection (e.g., since certain options can only be set and/or managed prior to transmissions). In this instance, in response to transmission already occurring on the outbound web service connection or the outbound web service connection having a cached socket, then in step 830 the process may reset the outbound web service connection.

In step 835, the process may then modify the one or more socket options of the core TCP socket according to the determining in step 825 above. As such, the modified one or more socket options cause one or more downstream network devices 650 to handle traffic on the outbound web service connection based on the modified one or more socket options (e.g., with example reference to procedure 900 of FIG. 9 below). Illustratively, for example, the modified socket options may comprise a type of service (ToS) field within packet header 662, an explicit priority value field, or some form of transaction classification, where downstream devices are configured to prioritize the traffic based on the transaction classification. Other options that may be modified are also described above in greater detail, such as, e.g., enabling/disabling keepalive on the socket, setting the socket send or receive buffer size, and so on.

Optionally, one or more reports may be generated in step 840 regarding outbound web service connections at the device, as described above, such as having a comparison of original socket options 720 and modified socket options 725 for the outbound web service connections at the device.

The illustrative simplified procedure 800 may then end in step 845, notably with the option to continue receiving new connection callbacks and modifying further socket options according to the steps detailed above.

Figure 9:
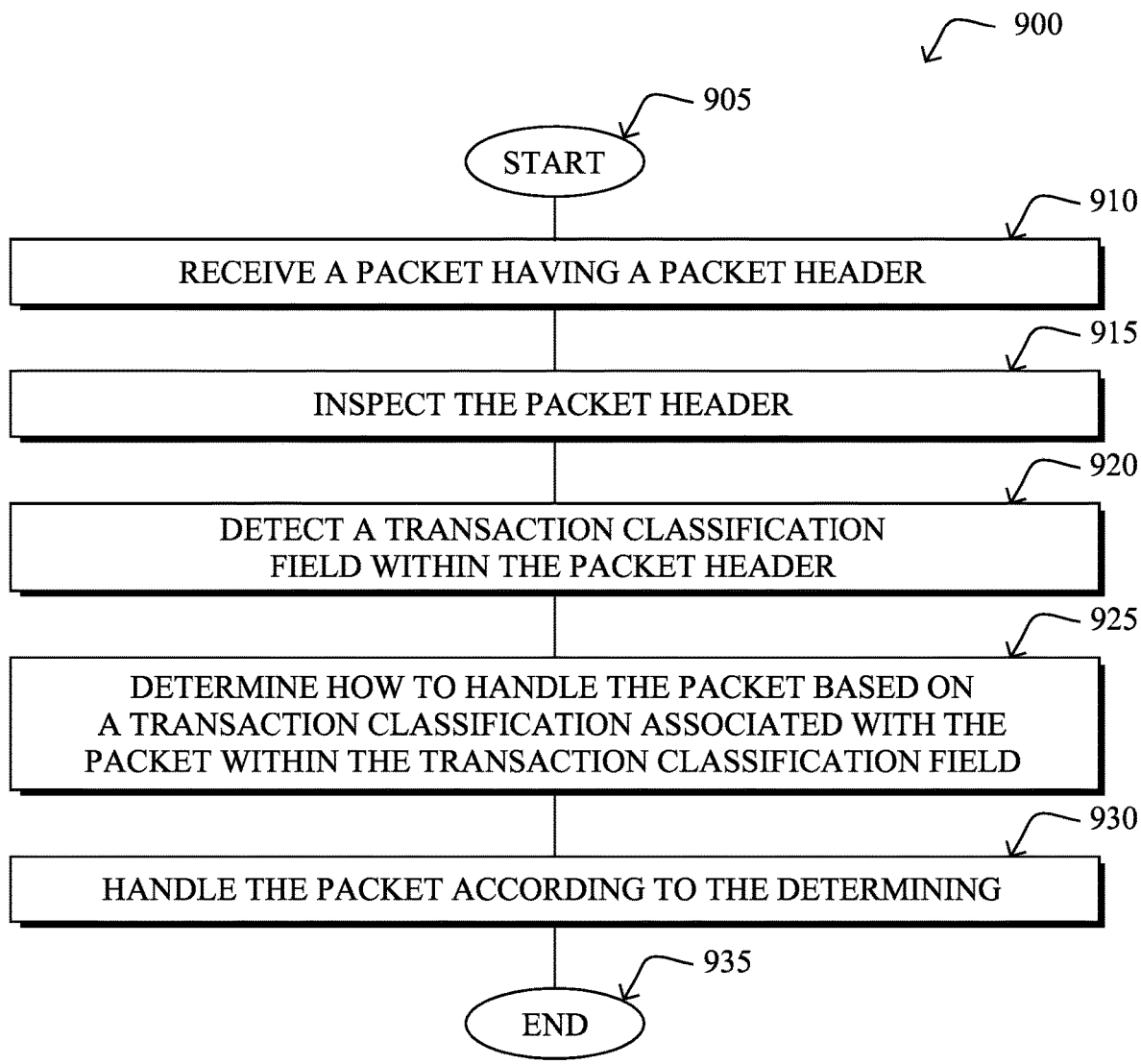
FIG. 9 illustrates another example simplified procedure for dynamic socket QoS settings for web service connections, particularly from the perspective of a downstream network device that processes the settings.

Additionally, FIG. 9 illustrates another example procedure for providing dynamic socket QoS settings for web service connections in accordance with one or more embodiments described herein, particularly from the perspective of a downstream network device that processes the settings. For example, one or more non-generic, specifically configured devices (e.g., downstream device 650) may perform procedure 900 by executing stored instructions (e.g., functional process 246). The procedure 900 may start at step 905, and continues to step 910, where, as described in greater detail above, the network device receives a packet 660 having a packet header 662. In step 915 the network device then inspects the packet header (notably not exclusively implying deep packet inspection, but optionally merely the TCP/IP header) to detect in step 920 a transaction classification field (e.g., ToS field) within the packet header. (Note that other fields or values that have been affected by a modified socket option as described above, and the embodiment discussed in procedure 900 of FIG. 9 is merely an illustrative example.)

In step 925, the network device may then determine how to handle the packet based on a transaction classification associated with the packet within the transaction classification field. That is, the network device may prioritize processing of the packet based on the transaction classification associated with the packet, as described above. As such, in step 930, the network device handles/processes the packet according to the determined action in step 925 (e.g., forwarding the packet based on a certain priority). The illustrative and simplified procedure 900 may then end in step 935, notably with the option to continue receiving further packets on this connection or other connections, accordingly.

It should be noted that certain steps within procedures 800 and 900 may be optional as described above, and the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800 and 900 are described separately, certain steps from each procedure may be incorporated into each other procedure, and the procedures are not meant to be mutually exclusive.

The techniques described herein, therefore, provide for dynamic socket QoS settings for web service connections. In particular, the techniques herein provide web applications with a way to specify a priority (e.g., ToS) for different web service transaction calls and to communicate to network equipment (routers, switches, load balancers, etc.) which transactions should have priority over others, and generally giving HTTP connections greater proactive control over the underlying socket performance settings (notably regardless of the web service interface used, such as URLConnection, HttpConnection, Feign, HttpClient, etc., and in a manner that is immune to encryption on the traffic). That is, since the techniques herein may be controlled at the application source, this gives application stakeholders an instrument to set socket options/priorities that has never before been available, and that requires no additional coding (e.g., all connections may be affected across the JVM—even if they are in third party libraries), notably without requiring the performance hit associated with traffic pattern matching and/or deep packet inspection (DPI) found in alternative techniques. Further, as described above, the techniques herein may be based on application context awareness, thus making decisions more accurately, and more granularly, (e.g., allowing for web service transaction types to have different priorities, or even different priorities for different code locations within an application, and so on). In addition, the techniques herein allow for dynamic optimization/tuning of the underlying transport (e.g., changing buffer sizes, timeouts, etc.) based on behavioral learning, as mentioned above.

While there have been shown and described illustrative embodiments that provide for dynamic socket QoS settings for web service connections, it is to be understood that various other adaptations and modifications may be made within the spirit and scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any invention or of what may be claimed, but rather as descriptions of features that may be specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure may have been described in terms of being performed "by a server", "by a controller", "by an agent", etc., those skilled in the art will appreciate that agents (e.g., application agents, network agents, language agents, etc.) may be considered to be extensions of a server (or controller) operation, and as such, any process step performed by either a server or agent need not be limited to processing on a specific device, unless otherwise specifically noted as such. Moreover, while certain embodiments of the description above relate to features of an application intelligence platform, the techniques herein are not limited to use with an application intelligence platform environment, and may be used on any application/device, e.g., as a standalone process or as a plug-in to an application, a library, a module, etc.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, by a process on a computer, a callback in response to an intercepted outbound web service connection called by an application executing on the computer;
    extracting, by the process, information from the callback, the information comprising at least a uniform resource locator (URL) for the outbound web service connection and a code location within the application from which the outbound web service connection was called;
    obtaining, by the process in response to the callback, access to a core transmission control protocol (TCP) socket for the outbound web service connection;
    determining, by the process, how to modify one or more socket options of the core TCP socket by applying the extracted information comprising the URL and the code location to one or more selected criteria; and
    modifying, by the process, the one or more socket options of the core TCP socket according to the determining, the modified one or more socket options causing one or more downstream network devices to handle traffic on the outbound web service connection based on the modified one or more socket options.

2. The method as in claim 1, wherein the modified one or more socket options comprise a type of service (ToS) field.

3. The method as in claim 1, wherein the modified one or more socket options comprise a transaction classification, wherein the one or more downstream devices are configured to prioritize the traffic based on the transaction classification.

4. The method as in claim 1, wherein the one or more selected criteria comprise a transaction type, and wherein modifying the one or more socket options according to the transaction type results in certain transaction types having higher priority than other transaction types.

5. The method as in claim 1, wherein the one or more selected criteria are selected from a group consisting of: a transaction name; the code location; a host of the URL; a port of the URL; a combination of the host and port; one or more URL fields; the application calling outbound web service connection; a time at which the outbound web service connection was called; and a behavioral-based factor of the called outbound web service connection.

6. The method as in claim 1, wherein the modified one or more socket options comprise a priority value field.

7. The method as in claim 1, wherein the modified one or more socket options are selected from a group consisting of: sending urgent data on the socket; enabling/disabling keepalive on the socket; enabling/disabling receipt of TCP urgent data; setting performance preferences for the socket; setting the socket receive buffer size; enabling/disabling reusing an address of the socket; setting the socket send buffer size; setting a client socket implementation factory for the application; enabling/disabling and setting a socket linger time; enabling/disabling and setting a socket timeout; enabling/disabling a TCP no-delay value on the socket; enabling/disabling a Nagle's algorithm on the socket; setting a traffic class in an IP header for packets sent from this socket; and setting a type-of-service (ToS) field in an IP header for packets sent from this socket.

8. The method as in claim 1, further comprising:
receiving instructions from a controller on how to modify one or more socket options of the core TCP socket based on the one or more selected criteria.

9. The method as in claim 1, further comprising:
generating a report on outbound web service connections at the device, the report comprising a comparison of original socket options and modified socket options for the outbound web service connections at the device.

10. The method as in claim 1, wherein determining how to modify one or more socket options of the core TCP socket based on one or more selected criteria is directed by a machine learning (ML)-based adjustment of socket options according to learned behavior and a desired outcome.

11. The method as in claim 1, further comprising:
ensuring modification of the one or more socket options prior to transmission occurring on the outbound web service connection.

12. The method as in claim 11, further comprising, in response to transmission already occurring on the outbound web service connection or the outbound web service connection having a cached socket:
resetting the outbound web service connection; and
modifying the one or more socket options prior to transmission occurring on the reset outbound web service connection.

13. The method as in claim 1, wherein the process is a registered class for the callback and is separate from the application making the call for the outbound web service connection, the registered class configured to receive a callback on every HTTP connection.

14. The method as in claim 1, wherein the intercepted outbound web service connection is intercepted by a byte code instrumentation (BCI) process on the device.

15. The method as in claim 1, wherein the outbound web service connection is one of either a hypertext transfer protocol (HTTP) connection or an HTTP secure (HTTPS) connection.

16. The method as in claim 1, further comprising:
determining to modify socket options for only certain outbound web service connections on the device based on one or more selected criteria according to the extracted information from the callback.

17. A tangible, non-transitory, computer-readable medium storing program instructions that cause a computer to execute a process, the process comprising:
receiving a callback in response to an intercepted outbound web service connection called by an application executing on the computer;
extracting information from the callback, the information comprising at least a uniform resource locator (URL) for the outbound web service connection and a code location within the application from which the outbound web service connection was called;
obtaining, in response to the callback, access to a core transmission control protocol (TCP) socket for the outbound web service connection;
determining how to modify one or more socket options of the core TCP socket by applying the extracted information comprising the URL and the code location to one or more selected criteria; and
modifying the one or more socket options of the core TCP socket according to the determining, the modified one or more socket options causing one or more downstream network devices to handle traffic on the outbound web service connection based on the modified one or more socket options.

18. The computer-readable medium as in claim 17, wherein the modified one or more socket options comprise a type of service (ToS) field.

19. The computer-readable medium as in claim 17, wherein the modified one or more socket options comprise a transaction classification, wherein the one or more downstream devices are configured to prioritize the traffic based on the transaction classification.

20. The computer-readable medium as in claim 17, wherein the one or more selected criteria comprise a transaction type, and wherein modifying the one or more socket options according to the transaction type results in certain transaction types having higher priority than other transaction types.

21. The computer-readable medium as in claim 17, wherein the one or more selected criteria are selected from a group consisting of: a transaction name; the code location; a host of the URL; a port of the URL; a combination of the host and port; one or more URL fields; the application calling outbound web service connection; a time at which the outbound web service connection was called; and a behavioral-based factor of the called outbound web service connection.

* * * * *